(12) United States Patent
Sinnarajah et al.

(10) Patent No.: US 7,277,694 B2
(45) Date of Patent: Oct. 2, 2007

(54) METHOD AND APPARATUS FOR COMMENCING SHARED OR INDIVIDUAL TRANSMISSION OF BROADCAST CONTENT IN A WIRELESS TELEPHONE NETWORK

(75) Inventors: Ragulan Sinnarajah, San Diego, CA (US); Jun Wang, San Diego, CA (US); Tao Chen, San Diego, CA (US); Raymond T. Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 926 days.

(21) Appl. No.: 10/278,516

(22) Filed: Oct. 22, 2002

(65) Prior Publication Data

US 2004/0203655 A1   Oct. 14, 2004

(51) Int. Cl.
*H04M 3/42* (2006.01)
(52) U.S. Cl. .............................. 455/414.1; 455/550.1; 455/561
(58) Field of Classification Search ............. 455/414.1, 455/561, 550.1
See application file for complete search history.

(56) References Cited

U.S. PATENT DOCUMENTS

| 6,104,709 | A | 8/2000 | Rinchiuso et al. | |
|---|---|---|---|---|
| 6,256,509 | B1* | 7/2001 | Tanaka et al. | 455/515 |
| 2002/0019228 | A1* | 2/2002 | McKenna et al. | 455/435 |
| 2003/0036384 | A1* | 2/2003 | Chen et al. | 455/437 |
| 2003/0119452 | A1* | 6/2003 | Kim et al. | 455/69 |

FOREIGN PATENT DOCUMENTS

| EP | 1077539 | 2/2001 |
|---|---|---|
| GB | 2346512 | 8/2000 |
| WO | 02080590 | 10/2002 |

OTHER PUBLICATIONS

Universal Mobile Telecommunication System (UMTS); Multimedia Broadcast/Multicast Service (MBMS); Stage 1 (3GPP TS 22.146 version 5.2.0) ETSI TS 122 145 V5.2.0, (2002) pp. 1-15.

* cited by examiner

*Primary Examiner*—Duc M. Nguyen
*Assistant Examiner*—Aung T. Win
(74) *Attorney, Agent, or Firm*—Kent D. Baker; Roberta A. Young; Thomas Rouse

(57) ABSTRACT

A wireless communications network (100) includes roving subscriber-stations (114) and base stations (110) receiving broadcast programs from a content server. A subscriber-station evaluates (618, 620) whether a desired program is available from a subject base station. According to this evaluation, the subscriber-station takes steps to (1) receive the desired program on a shared channel for reception by multiple subscriber-stations (816), or (2) initiate (804, 720) base station delivery (724) of the desired program to the subscriber-station on an individual channel. Responsive to a message from a subject subscriber-station identifying a desired program, a base station either (1) continues (819) transmitting the desired program upon a shared channel, (2) starts (816) transmitting the desired program on a shared channel, or (3) sends the subject subscriber-station a channel assignment message and commences transmission (722) of the desired program on the assigned individual channel.

2 Claims, 9 Drawing Sheets

IDLE MESSAGING

ACCESS MESSAGING

TRAFFIC MESSAGING

EXEMPLARY BROADCAST SYSTEM PARAMETERS MESSAGE (BSPM)

| PROGRAM | AVAILABLE ON INDIVIDUAL CHANNEL ? | AVAILABLE ON SHARED CHANNEL ? | SHARED CHANNEL CHARACTERISTICS | SHARED CHANNEL IDENTITY | TRANSMITTING NOW ON SHARED ? |
|---|---|---|---|---|---|
| CNN | YES | YES | WALSH CODE = X, MODULATION = Y, DATA RATE = Z ... | CH. 1 | YES |
| ESPN | NO | NO | ... | CH. 2 | NO |
| WEATHER CHANNEL | YES | YES | ... | CH. 3 | NO |
| WGN | NO | YES | ... | CH. 4 | YES |

METHOD AND APPARATUS FOR COMMENCING SHARED OR INDIVIDUAL TRANSMISSION OF BROADCAST CONTENT IN A WIRELESS TELEPHONE NETWORK

BACKGROUND

1. Field

The present invention generally relates to wireless telephone networks with added capacity for delivering broadcast content. More particularly, the invention concerns the initiation of broadcast content delivery to a wireless subscriber-station on a shared or individual communication channel.

2. Background

Many communication systems transmit information signals from an origination station to a physically distinct destination station. The information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, that is, simultaneous transmission and/or reception, of several signals over a common communication channel. Multiple-access communication systems often include a plurality of subscriber units requiring intermittent service of relatively short duration rather than continuous access to the common communication channel. Several multiple-access techniques are known in the art, such as time division multiple-access (TDMA), frequency division multiple-access (FDMA), amplitude modulation multiple-access (AM), and code division multiple-access (CDMA) spread spectrum. Multiple-access communication systems may be wireless or wireline and may carry voice and/or data.

In a multiple-access wireless communication system, communications between users are conducted through one or more base stations. In one example, one user on a first wireless subscriber-station communicates with another user on a second wireless subscriber-station by transmitting data on a reverse link to a base station. The base station receives the data and, if necessary, routes the data to another base station. Ultimately, the data is transmitted on a forward link of the final base station to the second subscriber-station. "Forward" link refers to transmission from a base station to a wireless subscriber-station and the "reverse" link refers to transmission from a wireless subscriber-station to a base station. In many communication systems, the forward link and the reverse link utilize separate frequencies. Communication can also be conducted between one user on a wireless subscriber-station and another user on a landline station. In this case, a base station receives the data from the subscriber-station on a reverse link, and routes the data through a public switched telephone network (PSTN) to the landline station. Communications also occur in the opposite direction. The foregoing wireless communication services are examples of "point-to-point" communication service. In contrast, "broadcast" services deliver information from a central station to multiple subscriber-stations ("multipoint"). The basic model of a broadcast system consists of a broadcast net of users served by one or more central stations, which transmit news, movies, sports, or other "content" to the users. Here, each subscriber-station monitors a common broadcast forward link signal. Because the central station fixedly determines the content, the users do not generally communicate back. Examples of common usage of broadcast services communication systems are television, radio, and the like. Such communication systems are generally highly specialized.

With recent advancements in wireless telephone systems, there has been growing interest in using the existing, chiefly point-to-point wireless telephone infrastructure to additionally deliver broadcast services. In this respect, a number of important advances have been made by QUALCOMM CORPORATION of San Diego, Calif. The following references describe various QUALCOMM advances relating to the use of shared communications channels to deliver broadcast content in a wireless telephone network.

U.S. patent application Ser. No. 09/933,978, filed on Aug. 20, 2001, in the names of Sinnarajah et al. and entitled "METHOD AND APPARATUS FOR SIGNALLING IN BROADCAST COMMUNICATIONS SYTEM." U.S. patent application Ser. No. 10/192,132, filed on Jul. 9, 2002 and entitled "METHOD AND SYSTEM FOR MULTICAST SERVICE INITIATION IN A COMMUNICATION SYSTEM." U.S. patent application Ser. No. 09/933,912, filed on Aug. 20, 2001 and entitled "METHOD AND SYSTEM FOR UTILIZATION OF AN OUTER DECODER IN A BROADCAST SERVICES COMMUNICATIONS SYSTEM." U.S. patent application Ser. No. 09/933,971, filed on Aug. 20, 2001 and entitled "METHOD AND APPARATUS FOR OVERHEAD MESSAGING IN A WIRELESS COMMUNICATION SYSTEM." The entirety of the foregoing references is hereby incorporated by reference into the present disclosure.

Although the foregoing applications are satisfactory in many respects, one aspect of wireless broadcast systems that has not been fully developed is the initiation of broadcast service in a system with both shared and individual broadcast capabilities.

SUMMARY

A wireless communications network includes roving subscriber-stations and numerous base stations receiving broadcast programs from a content server. A subscriber-station evaluates whether a desired broadcast program is available from a subject base station. In accordance with this evaluation, the subject subscriber-station takes measures to (1) receive the desired program on a shared channel for reception by multiple subscriber-stations, or (2) initiates base station delivery of the desired program to the subscriber-station on an individual channel. Responsive to a message from a subject subscriber-station identifying a desired program, a base station either (1) continues transmitting the desired program upon a shared channel, (2) starts transmitting the desired program on a shared channel, or (3) sends the subject subscriber-station a channel assignment message and commences transmission of the desired program on the assigned individual channel.

BRIEF DESCRIPTION OF THE DRAWINGS

FIG. 9 is a diagram showing exemplary layout and contents of an a broadcast system parameters message (BSPM).

DETAILED DESCRIPTION

The nature, objectives, and advantages of the invention will become more apparent to those skilled in the art after considering the following detailed description in connection with the accompanying drawings.

Hardware Components & Interconnections

Introduction

As mentioned above, the present disclosure utilizes a wireless communications network with various base stations and subscriber-stations, among other components. Some or all base stations are programmed to provide broadcast content services to subscriber-stations using individual channels (each dedicated for use by an individual subscriber-station) and/or shared channels (for common reception by multiple subscriber-stations). Further detail is provided below concerning the overall design and operation of this system, as well as its various components.

Wireless Communications System

Figure 1:
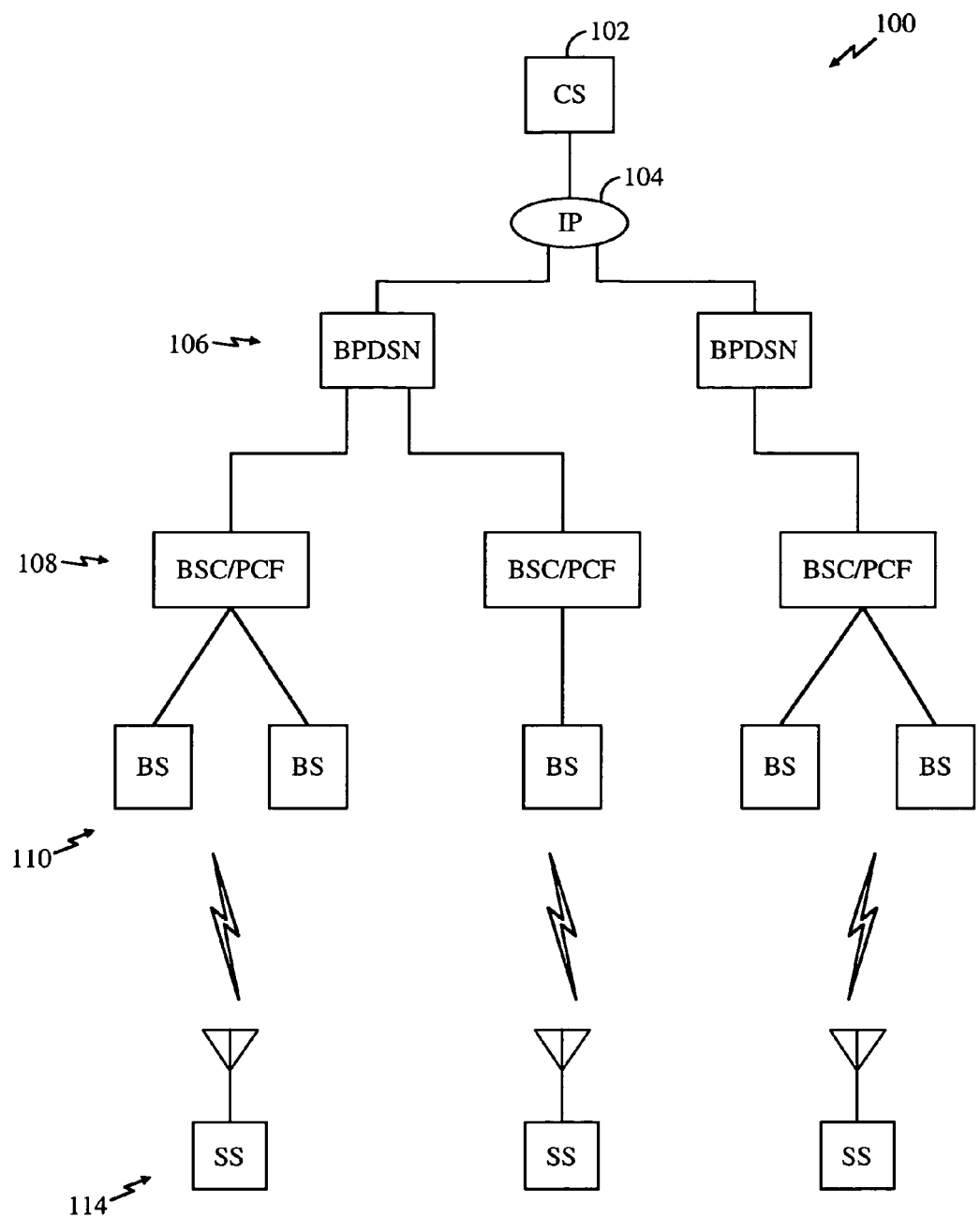
FIG. 1 is a block diagram of some hardware components and interconnections in a wireless communications network.

According to an exemplary model of a broadcast system, a number of subscriber-stations are served by one or more base stations that transmit broadcast content such as news, movies, sports events, and the like. FIG. 1 illustrates block diagram of a communication system 100, capable of performing high-speed broadcast service (HSBS) under various embodiments of the present invention.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard. A system for communication of data is also detailed in the "TIA/EIA/IS-856 cdma2000 High Rate Packet Data Air Interface Specification. A copy of the standards may be obtained by accessing the world wide web at the address: http://www.3gpp2.org. or by writing to TIA, Standards and Technology Department, 2500 Wilson Boulevard, Arlington, Va. 22201, United States of America. The standard generally identified as UMTS standard, may be obtained by contacting 3GPP Support Office, 650 Route des Lucioles-Sophia Antipolis, Valbonne-France.

Broadcast content originates at a one or more content servers (CS) 102. The content server 102 comprises one or more digital data processing machines such as a personal computer, computer workstation, mainframe computer, computer network, microprocessor, or other computing facility to deliver packet-formatted (or other formatted) broadcast content to broadcast-packet-data-serving-nodes (BPDSN) 106 via Internet connection 104 or other (not shown) non-Internet network or direct connection. Depending upon the manner of implementation, the nodes 106 may utilize the same or different hardware as packet data switching nodes (PDSNs) of the type that are well known in wireless telephony. According to each packet's destination, a nodes 106 delivers the packets to an appropriate packet control function (PCF) module 108. Each module 108 controls various functions of base stations 110 related to delivery of high speed broadcast services. Among other functions, the modules 108 forward broadcast packets to the base stations 110. Each module 108 may utilize the same or different hardware as a base station controller (BSC) of the type that are well known in wireless telephony.

The base stations 110 deliver broadcast content and conventional wireless telephone calls to subscriber-stations 114. The base stations 110 may be implemented using hardware such as that used by conventional base stations commercially used today.

Exemplary Digital Data Processing Apparatus

Data processing entities such as components 102, 106, 108, 110, 114 (FIG. 1), or any one or more of their subcomponents may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Wireless Telephone

Figure 3:
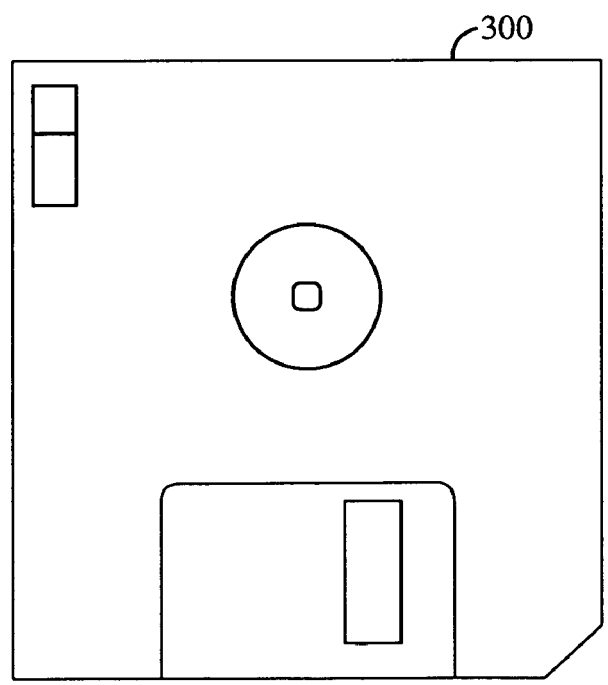
FIG. 3 is an exemplary signal bearing medium.
Figure 4:
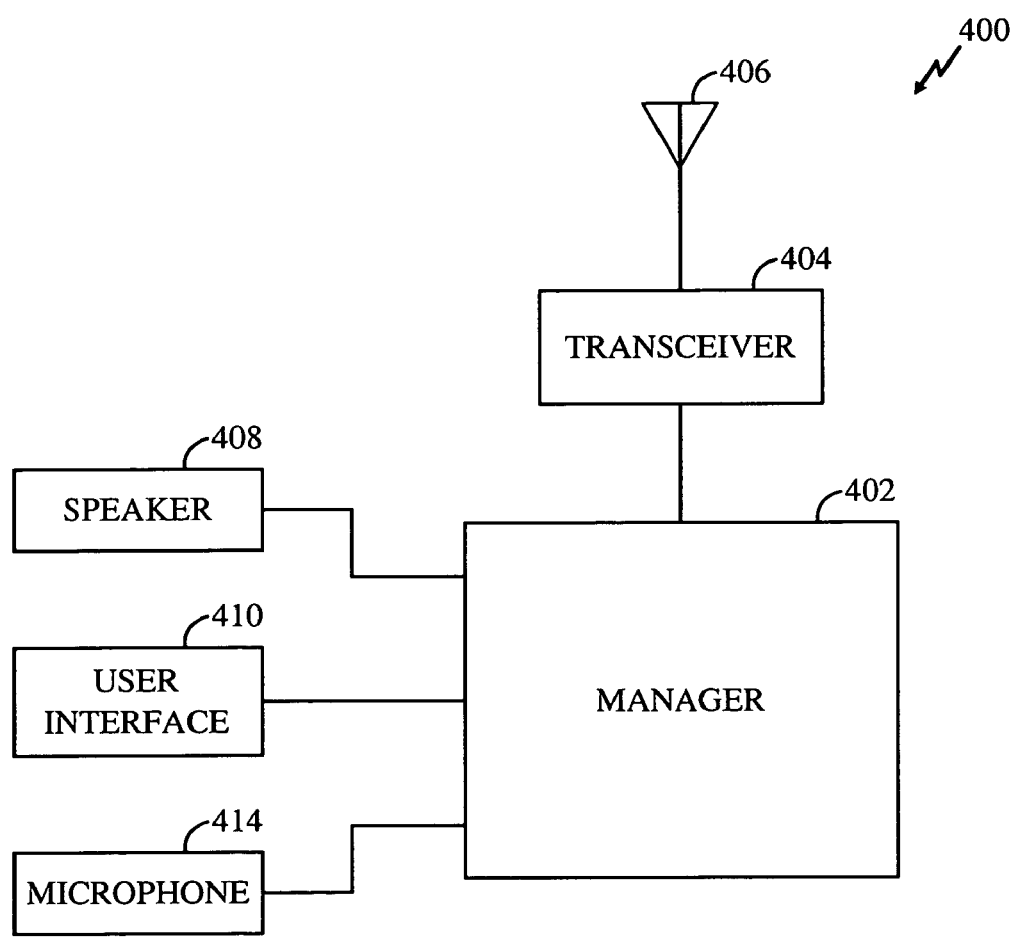
FIG. 4 is a block diagram of the hardware components and interconnections in a subscriber-station implemented as a wireless remote apparatus.

FIG. 4 further illustrates the construction of an exemplary subscriber-station 114 by depicting a wireless telephone 400. The telephone 400 includes a speaker 408, user interface 410, microphone 414, transceiver 404, antenna 406, manager 402, along with other optional conventional circuitry that may (or may not) be included depending upon the application. The manager 402, which may comprise circuitry such as that discussed above in conjunction with FIGS. 3-4, manages operation of the components 404, 408, 410, and 414 as well as signal routing between these components.

Although the wireless telephone 400 is illustrated, a subscriber-station may be mobile or stationary. Furthermore, a subscriber-station may comprise any data device that communicates through a wireless channel or through a wired channel, for example using fiber optic or coaxial cables. In addition to (or instead of) wireless and wireline phones, a subscriber-station may be configured to implement various other devices including but not limited to PC card, compact flash, external or internal modem, etc.

OPERATION

Having described various structural features, some operational aspects of the present disclosure are now described. As mentioned above, operation of the system 100 relates to the initiation of broadcast content delivery to wireless subscriber-stations using a shared or individual communication channel.

Signal-Bearing Media

Figure 2:
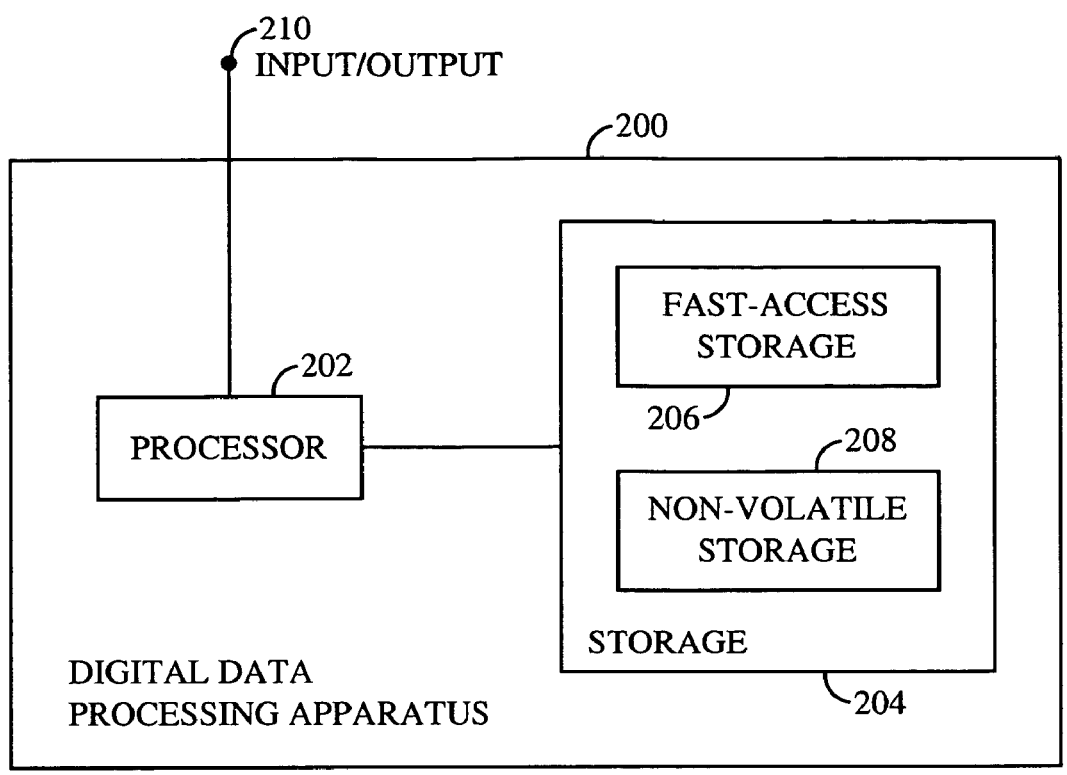
FIG. 2 is an exemplary digital data processing machine.

Wherever any functionality of the invention is implemented using one or more machine-executed program sequences, such sequences may be embodied in various forms of signal-bearing media. In the context of FIG. 2, such a signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method aspect of the invention. The logic circuitry may be implemented using many different types of circuitry, as discussed above.

Introduction to Operational Details

As mentioned above, some (or all) of the base stations 110 receive broadcast content from the content server 102; this content includes various broadcast "programs."

A subscriber-station evaluates whether a desired broadcast program is available from a subject base station. In accordance with this evaluation, the subject subscriber-station takes steps to (1) receive the desired program on a shared channel for reception by multiple subscriber-stations, or (2) initiate base station delivery of the desired program to the subscriber-station on an individual channel.

From the base station perspective, operations are performed as follows. Responsive to a message from a subject subscriber-station identifying a desired program, a base station either (1) continues transmitting the desired program upon a shared channel, (2) starts transmitting the desired program on a shared channel, or (3) sends the subject subscriber-station a channel assignment message and commences transmission of the desired program on the assigned individual channel.

Subscriber-Stations—Call Model

Figure 5A:
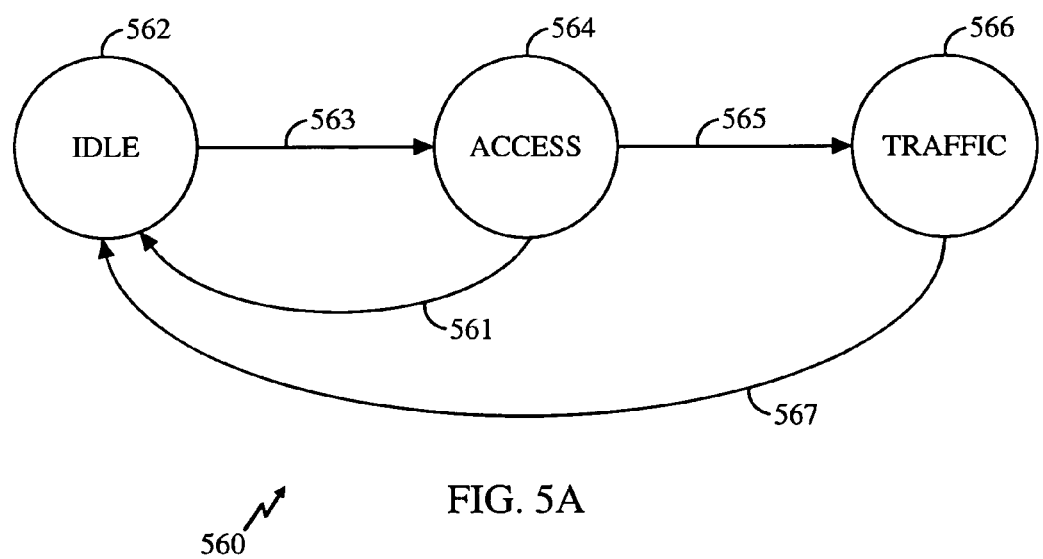
FIG. 5A is a state diagram illustrating the operational states of a subscriber-station.

Each subscriber-station operates according to the state diagram 560 of FIG. 5A. In the IDLE state 562, the subscriber-station monitors a shared paging channel and a shared overhead channel, described in greater detail below. These channels are shared in the sense that every base station broadcasts these channels to all subscriber-stations in range. Briefly, the shared paging channel advises subscriber-stations of incoming calls and the shared overhead channel supplies various system related information. In the IDLE state 562, the subscriber-station may additionally receive broadcast content from the base station via one or more shared broadcast channels. In the IDLE state 562, the subscriber-station's transmitter is turned off.

In one case, transition 563 from IDLE 562 to ACCESS 564 may occur when the subscriber-station sends a REGISTRATION message, advising nearby base stations of the subscriber-station's presence, identity, features, etc. In this case, the ACCESS state 564 transitions 561 back to IDLE 562 after the REGISTRATION message.

In another situation, transition 563 from IDLE 562 to ACCESS 564 occurs during the establishment of a point-to-point call, either by the subscriber-station or another party. As one example, if another party initiates the call, the subscriber-station receives a paging message over the common paging channel. After the subscriber-station answers the page on a common "access" channel, the subscriber-station receives assignment of a traffic channel on which to conduct the point-to-point call. The subscriber-station initiates an outgoing call by sending an appropriate message on the access channel, and then receiving channel assignment in the same manner.

Transition 565 from ACCESS 564 to TRAFFIC 566 occurs when an incoming or outgoing call goes through, and the subscriber-station and base station begin to communicate on the traffic channel. In the TRAFFIC state 566, the subscriber-station utilizes an individual traffic channel to conduct point-to-point communications with another party. The newly initiated point-to-point call may conduct voice, data, or even broadcast information as discussed below. If the point-to-point call carries broadcast content, then it substitutes for any shared broadcast that the subscriber-station was previously receiving in the IDLE state 562.

Transition 567 from the TRAFFIC 566 back to IDLE 562 occurs when the point-to-point call is terminated by either party or when the connection is otherwise broken. Transition 567 includes release of the traffic channel used to conduct the point-to-point call. If this point-to-point call contained broadcast content, then the transition 567 may optionally result in resumption of broadcast content delivery via shared channel in the IDLE state 562.

Channels

Figure 5B:
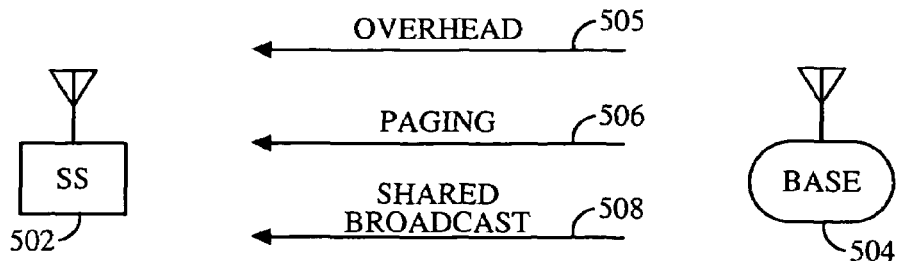
FIGS. 5B-5D are block diagrams illustrating different messages exchanged between subscriber-station and base stations during IDLE, ACCESS, and TRAFFIC states, respectively.
Figure 5C:
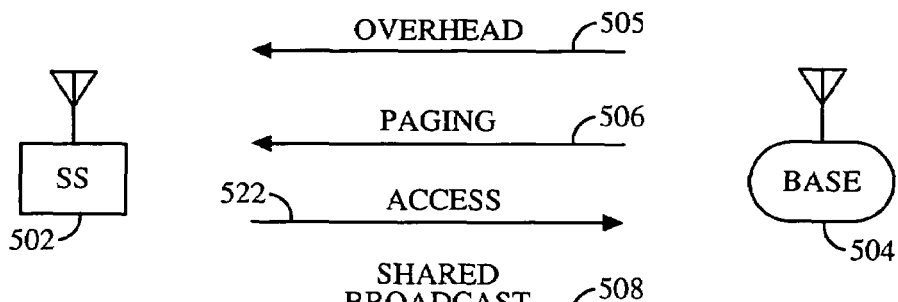
Figure 5D:
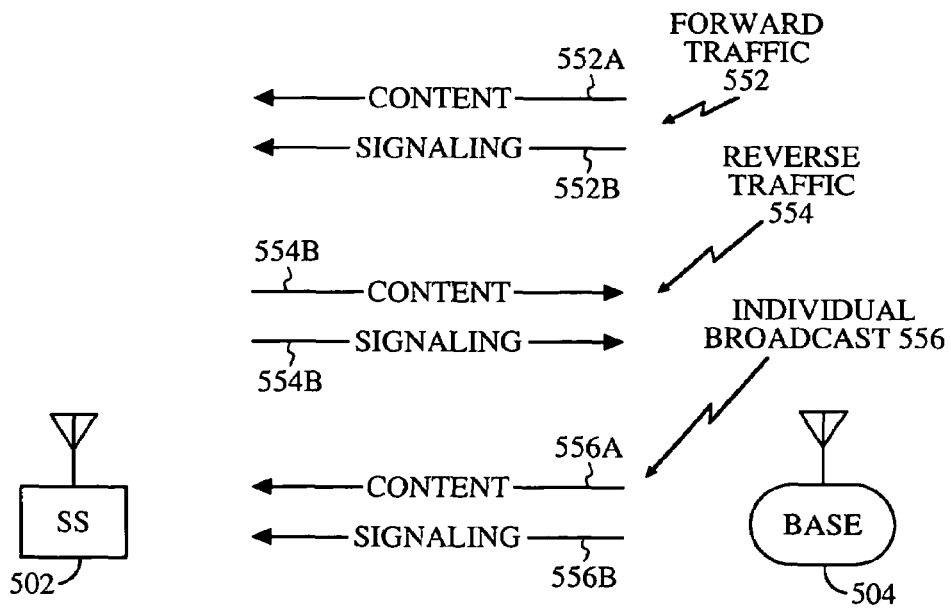

FIGS. 5B-5D describe some of the primary communications channels used to relay information between subscriber-station and base station during the IDLE, ACCESS, and TRAFFIC states discussed above. The broadcast channels of the present disclosure may be utilized to relay data, audio, video, or any other desired content.

"Communication channel/link" refers to a physical channel or a logical channel in accordance with the context. "Physical channel" means a communication route over which a signal propagates described in terms of modulation characteristics and coding. "Logical channel" means a communication route within the protocol layers of either the base station or the subscriber-station. "Reverse channel/link" means a communication channel/link through which the subscriber-station sends signals to the base station. "Forward channel/link" means a communication channel/link through which a base station sends signals to a subscriber-station.

IDLE State

FIG. 5B addresses the IDLE state. The base station 504 transmits the overhead channel 505 for receipt by the subscriber-station 502 as well as all other subscriber-stations being served by that base station. The overhead channel 505 contains periodically repeated system information, such as information about neighboring base stations, access information (e.g., recommended power levels, maximum message size, etc.), and system parameters (such as product revision levels, supported features, etc). In a CDMA-2000 system, the overhead channel 505 may comprise the broadcast control channel (F_BCCH).

As one example, contents of the overhead channel 505 may include a broadcast system parameters message (BSPM), which specifies each different broadcast program that is available over shared and/or individual channels. A "program" is a particular stream of broadcast content, such as CNN news, or ESPN, or weather information, etc. The BSPM indicates which program is on each of the base station's shared channels (and the frequency or other channel identity), and which programs can be obtained on individual channels (with specific frequencies to be determined at the time of establishing service on the individual channel). The BSPM also lists certain other information, as described in greater detail below in conjunction with FIG. 9.

The base station 504 also transmits a shared paging channel 506 for receipt by all subscriber-stations being served by that base station. All subscriber-stations served by the base station 504 monitor the paging channel 506 so that they can be alerted upon arrival of a point-to-point call or other information for them. In CDMA-2000, the paging channel 506 is exemplified by the forward control channel (F_CCCH).

The shared broadcast channel 508 encompasses potentially many shared broadcast sub-channels (parallel channels) transmitted by the base station 504 for use by subscriber-stations in-range of the base station. Broadly, the communication system 100 enables high-speed broadcast service by introducing a forward broadcast supplemental channel (F_BSCH) capable of high data rates and suitable for receipt by a large number of subscriber-stations. The "forward broadcast supplemental channel" comprises a single forward link physical channel that carries broadcast traffic. One or more high-speed broadcast service channels are time-division-multiplexed within the single forward broadcast shared channel. Thus, the channel 508 may carry a number of different broadcast programs concurrently.

The shared broadcast channels 508 may be freely available to all subscriber-stations, or limited to subscriber-stations that have completed certain enrollment steps. Since the channel 508 is universally broadcast to all subscriber-stations within range, the subscriber-stations ultimately manage whether the user can access the broadcast or not based on whether the user has enrolled. As one example, each shared broadcast channel may be encrypted with a prescribed code, which is only provided to enrolled subscriber-stations.

A mechanism for enrollment to broadcast services is discussed in the following reference, the entirety of which is incorporated herein: U.S. patent application Ser. No. 09/934, 021, filed on Aug. 20, 2002 and entitled "METHOD AND APPARATUS FOR OUT OF BAND TRANSMISSION OF BROADCAST SERVICE OPTION IN A WIRELESS COMMUNICATION SYSTEM." In the foregoing application, the shared broadcast channel 508 is referred to as the forward broadcast supplemental channel (F-BSCH).

ACCESS State

FIG. 5C addresses the ACCESS state. The subscriber-station 502 continues to receive the overhead 505, paging 506, and shared broadcast 508 channels. The shared access channel 522 is used by all subscriber-stations served by the base station 504. To begin a point-to-point call, the access channel 522 can be used in two ways. For incoming calls, the subscriber-station 502 uses the access channel 522 to answer a page when another station is initiating a point-to-point call to the subscriber-station 502. For outgoing calls, the subscriber-station 502 uses the access channel 522 to request initiation of a point-to-point call. In the CDMA-2000 protocol, the access channel 522 is exemplified by the reverse access channel (R_ACH). During the ACCESS state 564, the subscriber-station 502 may continue to monitor the shared broadcast 508.

Apart from point-to-point call initiation, the subscriber-station 502 may use the access channel 522 to occasionally transmit a REGISTRATION message. This serves to advise the wireless network of the subscriber-station 502's location, along with any other relevant information. In the event of REGISTRATION or other similar messages occurring in the ACCESS state 564, the subscriber-station 502 returns to IDLE 562 without entering the TRAFFIC state 566.

TRAFFIC State

FIG. 5D addresses the TRAFFIC state 566. In this state, the traffic channels 552, 554 cooperatively conduct two-way point-to-point call data between the subscriber-station 502 and base 504. The channels 552, 554 are dedicated channels for individual use of the subscriber-station 502. The forward traffic channel 552, a "logical" channel, includes parallel physical channels such as the traffic-content channel 552a and the traffic-signaling channel 552b. The traffic-content channel 552a carries content, such as the voice information or data conveyed from the base 504 to the subscriber-station 502. The traffic-signaling channel 552b carries signaling information such as housekeeping, metadata, system information, and other information that describes the channel 552a and/or its content. In an alternative embodiment, the channels 552a, 552b may be unrelated, rather than being parallel channels as described. The reverse traffic channel 554 also includes parallel traffic-content and signaling channels 554a, 554b, conducting communications in the opposite direction of the channel 552.

In the TRAFFIC state, the subscriber-station does not use the access channel 522, overhead 505, or paging channels 506, since this information is conveyed on the dedicated signaling channels 552b, 554b instead.

During TRAFFIC 566, the subscriber-station 502 may continue to receive broadcast content. However, delivery of broadcast content concurrently with a point-to-point call 552/554 is necessarily conducted on a one-way point-to-point channel 556 rather than the shared channel 508. This is chiefly because the signaling and control procedures that are required for proper operation of mobile station are vastly different in IDLE versus TRAFFIC channels, and hence the mobile station can only be in one of these two states at any given time. Therefore, while traffic channels 552, 554 are in use, the exchange of any broadcast information during this time necessarily occurs on a traffic channel 556, with content occurring on 556a and signaling on 556b.

Generally, any forward link channel suitable for point-to-point calls may be used for the individual broadcast channel 556. Several more specific options are presented as follows. One option, using CDMA-2000 as an example, is the forward fundamental channel (F_FCH) or forward dedicated control channel (F_DCCH). This channel provides 14.4 kb/s. Another option is the forward supplemental channel (F_SCH), which provides up to 1 Mb/s. A still faster option is the forward packet data channel (F_PDCH), which provides still faster service up to 2.4 Mb/s.

Unlike the IDLE 562 and ACCESS 564 states, where the subscriber-station 502 only communicates with a single base station, the subscriber-station 502 in TRAFFIC may concurrently exchange traffic and broadcast content and signaling information with multiple base stations in order to effect a soft handoff, to obtain signal redundancy, or to achieve other goals. Therefore, ordinarily skilled artisans (having the benefit of this disclosure) will recognize that the present disclosure's references to "base station" (in the singular) are made for brevity and ease of discussion. Subscriber-stations may communicate with multiple base stations concurrently.

In addition, techniques are known for the subscriber-station 502 to conduct multiple two-way telephone conversations simultaneously on traffic channels 552, 554. These techniques involve, for example, time multiplexing different data streams so that a given channel can carry more than one. Utilizing similar technology, the present disclosure contemplates the subscriber-station 502 receiving multiple, concurrent broadcast programs on the individual channel 556.

Further Information

The physical and logical channels used in high speed broadcast services are discussed in greater detail in the following references, the entireties of which are incorporated herein by reference: (1) CDMA 2000 Physical Layer Standard, known as IS_2000.2, (2) U.S. patent application Ser. No. 09/933,978, filed Aug. 20, 2001 and entitled "METHOD AND APPARATUS FOR SIGNALING IN BROADCAST COMMUNICATION SYSTEM." The use of common and dedicated channels for information broadcast is disclosed in the following reference, the entirety of which is incorporated herein by reference: U.S. patent application Ser. No. 60/279,970, filed Mar. 28, 2001 and entitled "METHOD AND APPARATUS FOR GROUP CALLS USING DEDICATED AND COMMON CHANNELS IN WIRELESS NETWORKS."

BSPM

As mentioned above, a base station repeatedly broadcasts the BSPM over the overhead channel 505 to advise subscriber-stations of that base station's available broadcast content and related information. FIG. 9 shows an exemplary BSPM 900. Although expressed in tabular form for ease of understanding, the BSPM in practice comprises a stream of signals including headers, trailers, packet information, or other metadata and formatting suitable for wireless broadcast.

As shown in FIG. 9, the BSPM 900 includes various columns, each representing a different category of information. The column 900 lists the channel content, namely, that channel's "broadcast program." The column 906 indicates whether the base station is programmed, configured, or otherwise equipped with the ability to provide the subject program on individual channels, that is, whether the subject program is "available" on individual channel.

The column 908 indicates whether the subject base station is equipped to provide the subject program on a shared channel, that is, whether the subject program is "available" via shared channel from the base station. The column 904 lists various characteristics of the shared channel used to broadcast the subject program, such as Walsh code, modulation type, Viterbi coding, data rate, error correction, and the like. The column 909 lists the identity of the shared channel (if applicable) used to broadcast the subject program, namely, the logical frequency and/or physical bandwidth used by the subject base station. The column 910 indicates whether the base station is presently transmitting the subject program on the shared channel 909.

The BSPM may be expanded to include a variety of other information, and likewise abbreviated to leave out certain information listed above. For example, the base station may provide the channel identities 909 upon demand, to shorten the BSPM 900 and save bandwidth on the overhead channel 505. Likewise, the "now transmitting" column 910 may be omitted, since a subscriber-station may use trial and error to determine whether the base station is transmitting a particular program on shared channel.

Furthermore, as mentioned below, the BSPM may be omitted entirely. As another option, sole contents of the BSPM may be a flag (not shown) indicating the fact that broadcast services are generally available, and with further information being available from the base station upon subscriber-station query.

Introduction

Figure 6:
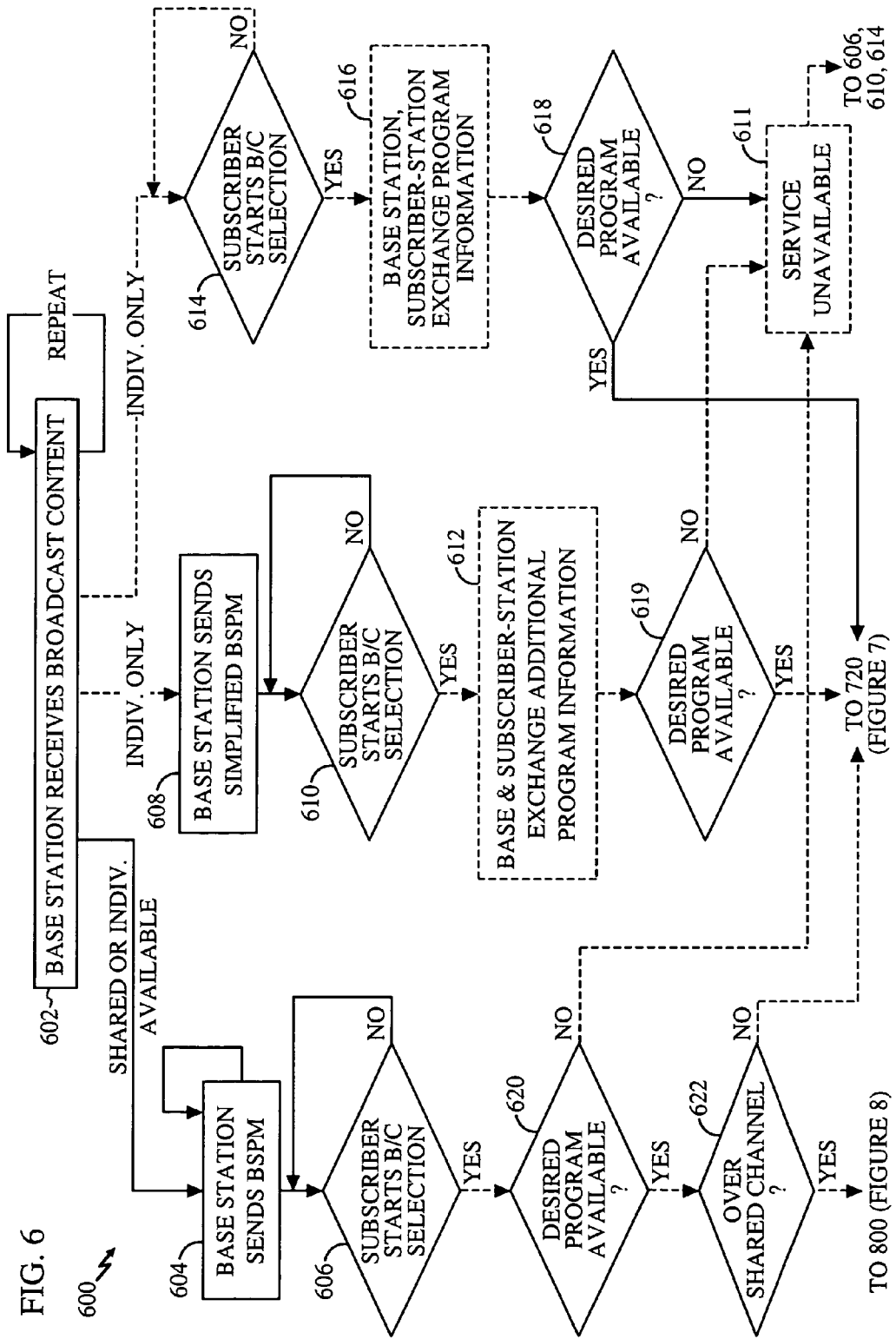
FIG. 6 is a flowchart showing operations related to determining broadcast program availability in a wireless communications network.

FIG. 6 shows a sequence 600 to illustrate operations related to determining broadcast program availability in a wireless communications network. The operations 600 lead to further operations 700 (to establish service where broadcast service is available via dedicated communication channel, as shown in FIG. 7) and operations 800 (to establish service where desired broadcast service is available via shared communication channel, as shown in FIG. 8).

Figure 7:
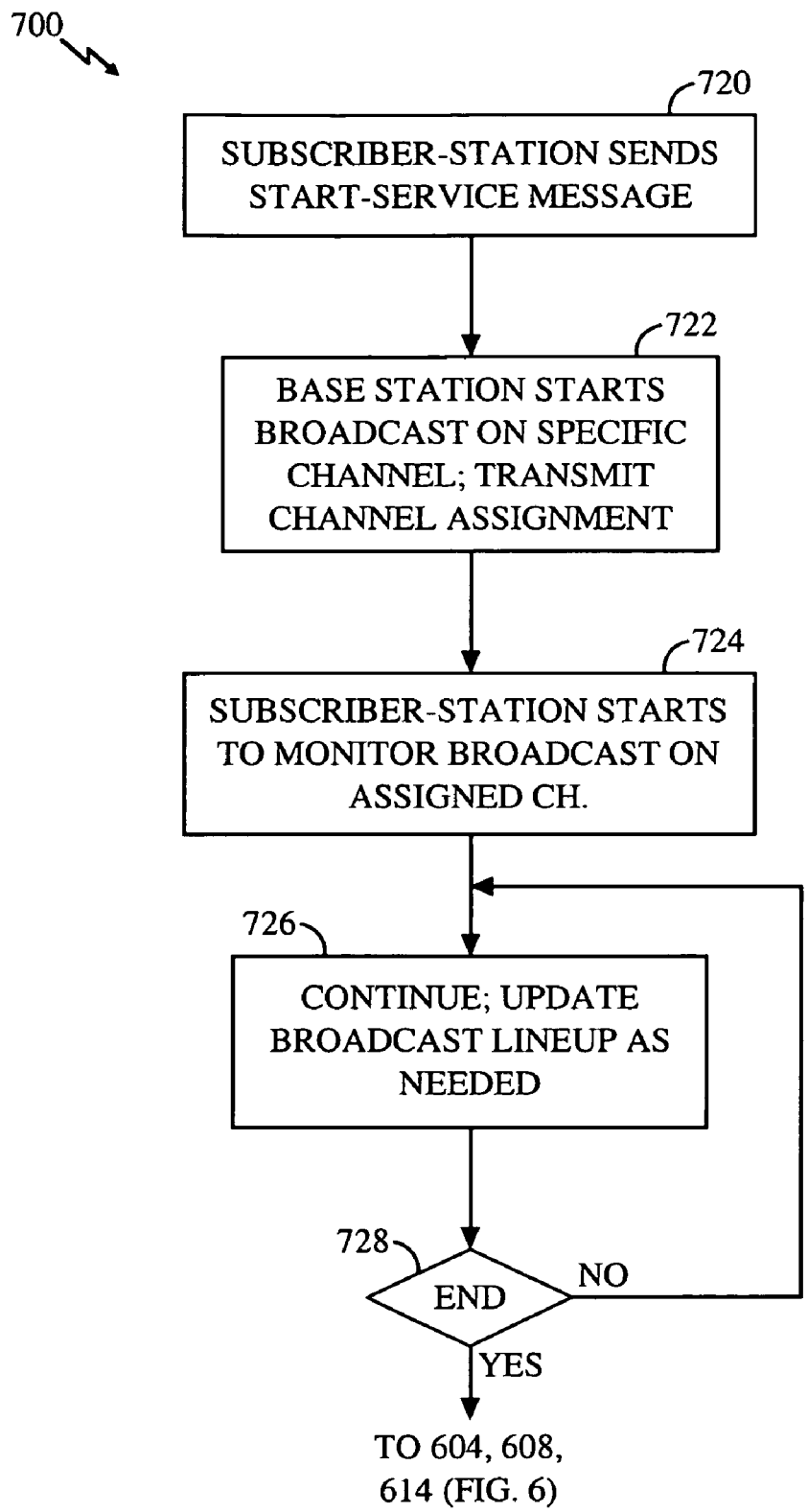
FIG. 7 is a flowchart showing operations of establishing service in a wireless communications network where desired broadcast service is available via dedicated communication channel.
Figure 8:
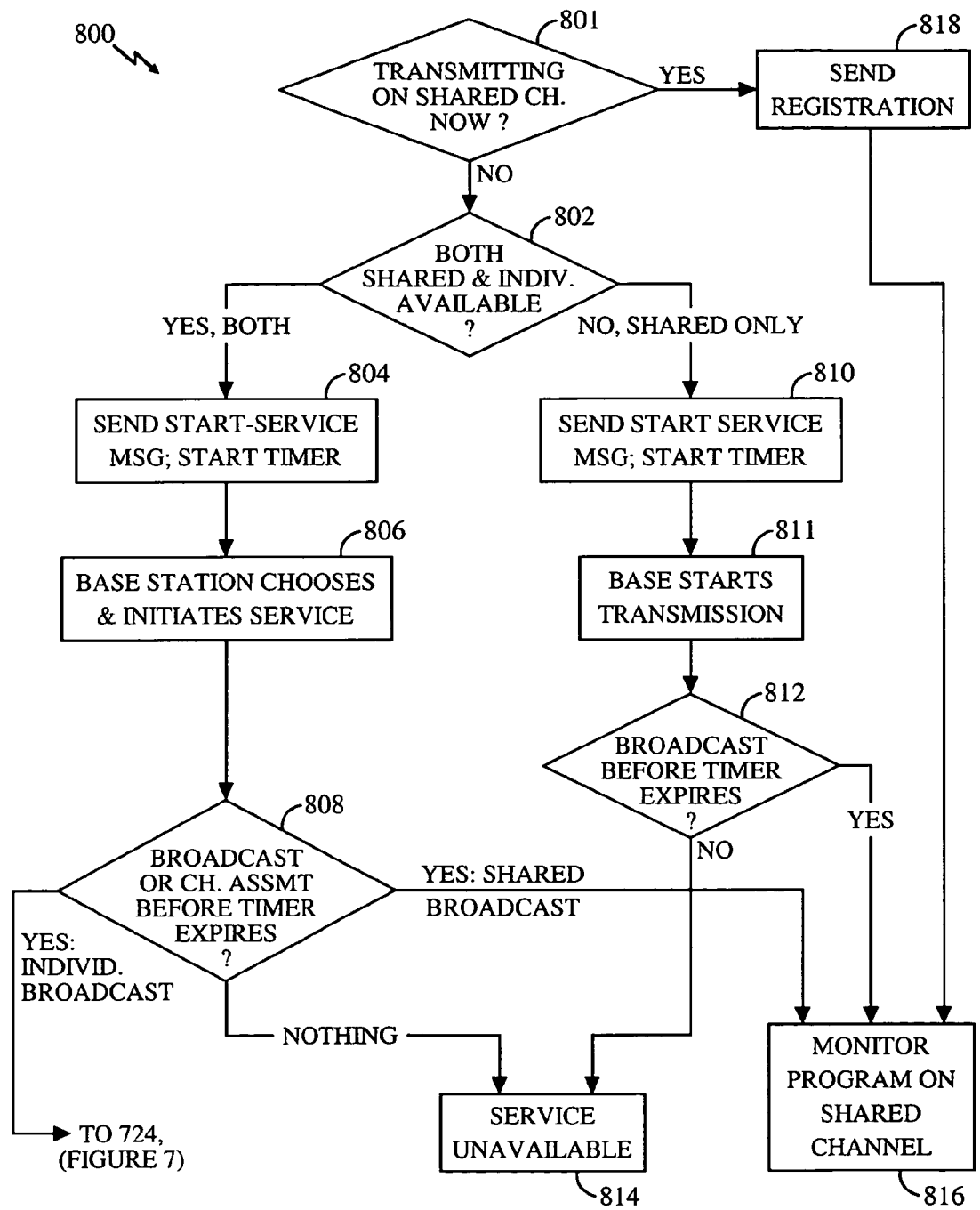
FIG. 8 is a flowchart showing operations of establishing service in a wireless communications network where desired broadcast service is available via shared communication channel.

For ease of explanation, but without any intended limitation, the examples of FIGS. 6-8 are described in the context of the hardware components of FIGS. 1-4. Also for ease of explanation, the sequences 600, 700, 800 are discussed in the context of an exemplary transaction between one base station (the "subject" base station) and one subscriber-station (the "subject" subscriber-station). The subject base station may concurrently repeat these sequences with other subscriber-stations. Likewise, other base stations besides the subject base station may also perform the illustrated sequences with any of their subscriber-stations. Furthermore, other subscriber-stations may repeat these sequences with the subject base station and/or other base stations.

Determining Service Availability (FIG. 6)

As mentioned above, the sequence 600 describes operations related to determining broadcast program availability in a wireless communications network.

Content Serving

In step 602, the subject base station receives broadcast content originating from the content server 102. The broadcast content includes one or more broadcast programs, each comprising a different stream of information. The broadcast programs may be buffered by the content server 102, or they may occur in real time. In one implementation, the subject base station receives each program in the form of a single stream of information; the base station then splits or replicates this stream to provide as many separate streams as are needed for the number of subscriber-stations receiving the program on separate channels. In another implementation, the subject base station receives a separate stream of information for each subscriber-station receiving that program on a different channel; thus, the base station receives ten streams if there are ten subscriber-stations requesting a particular program on individual channels. In this example, the program may be replicated at any one of the levels 102, 106, 108, depending upon bandwidth conservation, speed, hardware availability, cost, and other factors.

As illustrated, step 602 repeats because the subject base station is continually receiving new broadcast content. Optionally, to save system bandwidth and other resources, the base station may opt to stop receiving broadcast content whenever there are not any subscriber-stations requesting broadcast programs.

After step 602, the subject subscriber-station works with the subject base station to evaluate whether its user's desired program (if any) is available from that base station. Three different sequences are illustrated, each constituting a separate embodiment of the disclosure. One sequence includes steps 604, 606, 620, 622. The second sequence includes steps 608, 610, 612, 619. The third sequence includes steps 614, 616, 618.

Evaluating Program Availability—Option 1

The sequence 604/606 proceeds as follows. In step 604, the base station and subject subscriber-station exchange program information advising the subscriber-station about the availability of broadcast programs from the subject base station. More specifically, the base station in step 604 transmits its repeating BSPM upon the overhead channel 505 (FIG. 5B). The listing of available programs (e.g., column 900 of FIG. 9) is referred to as a broadcast lineup. The repeating BSPM, along with all other content of the overhead channel 505, is universally broadcast to all subscriber-stations within range of the base station.

In step 606, the subscriber-station determines whether its user has started to select a broadcast program. For instance, the user might operate the subscriber-station's keypad to scroll through a program listing (comprising a copy of the broadcast lineup), which is presented by the subscriber-station's video display. When the user selects a program, step 606 advances to step 620, which is described below.

Evaluating Program Availability—Option 2

The second sequence 608/610/612 proceeds as follows. In step 608, the base station transmits a "simplified" BSPM, which utilizes a flag or other indicator to briefly reflect the fact that broadcast programs are available from the source base station on individual channels; this simplified message does not list the identities or other information about the broadcast programs. In this embodiment, the base station is not equipped to provide broadcast content on shared channels. In step 608, the subscriber-station also receives the simplified BSPM and notes whether broadcast programs are available from the subject base station.

In step 610, the subscriber-station determines whether its user has started to select a broadcast program, for example by entering an appropriate menu entry, depressing a phone button, making a prescribed call to the network, etc. Next, in step 612, the subscriber-station queries the base station for the entire broadcast lineup, presents the updated program listing to the user (for example in the form of a keypad-activated scrolling menu), and receives the user's program selection. After step 612, the routine 600 goes to step 619, which is discussed below.

Step 612 is skipped, however, in the event that the subscriber-station had previously noted that broadcast programs are not available from the subject base station (upon receipt of the BSPM in step 608). In this case, there is no need for the step 610's information exchange between the subscriber-station and base station. Accordingly, step 610 goes directly to step 619 (discussed below), where the subscriber-station concludes that that the desired program is unavailable.

Evaluating Program Availability—Option 3

The sequence 614/616 proceeds as follows. In this sequence, the base station does not broadcast the BSPM or even the simplified BSPM. This is a demand-based approach. Namely, in step 614 the subscriber-station determines whether its user has started to select a broadcast program, for example by entering an appropriate menu entry, depressing a phone button, making a call, etc. At this point, the subscriber-station performs step 616. In step 616, the subscriber-station queries the base station for the broadcast lineup, presents this program listing to the user, and receives the user's program selection. After step 616, the routine 600 advances to step 618, discussed below.

Concurrent Broadcast Programs

In one embodiment, the subject base station and subscriber-station are equipped to handle multicast broadcast services, that is conducting multiple broadcast programs of the same shared/individual type concurrently. For example, the subscriber-station may receive multiple shared channels at the same time. In this embodiment, steps 606, 610, 614 may be initiated at any time, irrespective of the flow shown of sequence 600 shown in FIG. 6.

Conclusion as to Program Availability

After the respective sequences 604/606, 608/610/612, or 614/616, there are respective steps 620, 619, 618 to decide whether the user's requested program is available. These steps occur as follows.

Step 616 (discussed above) leads to step 618. In step 618, the subscriber-station reviews broadcast lineup information from the base station (obtained in step 616) to determine whether the user-requested program (identified in steps 616) is available from the subject base station. If not, then the routine 600 performs step 611, where the subscriber-station issues an appropriate message to advise its user that the requested program is unavailable. Then, after step 611, the routine 600 returns to step 614. If the desired program is available, step 618 proceeds to step 720 (FIG. 7, discussed below).

In contrast to step 616, step 612 (or step 610, if skip 612 is skipped) leads to step 619. In step 619, the subscriber-station reviews information from the base station (obtained in step 612) to determine whether the user-requested program (identified in step 610) is available from the subject base station. In the case where the subscriber-station noted that the broadcast programs are generally not available from the subject base station (as indicated by the BSPM in step 608), then step 619 goes to step 611. Step 619 also has a "no" answer if broadcast programs were available from the base station, but the base station upon query (step 612) revealed that the user's particular program is not available.

In step 611, the subscriber-station issues an appropriate message to advise its user that the requested program is unavailable. Then, after step 611, the routine 600 returns to step 610. If the desired program is available, step 619 proceeds to step 720 (FIG. 7, discussed below).

In contrast to steps 616 and 612, step 606 leads to step 620. In step 620, the subscriber-station reviews information from the base station (obtained in step 604) to determine whether the user-requested program (identified in step 606) is available from the subject base station. If not, then the routine 600 performs step 611, where the subscriber-station issues an appropriate message to advise its user that the requested program is unavailable. Then, after step 611, the routine 600 returns to step 606. If the desired program is available, step 620 proceeds to step 622 where the subscriber-station determines whether the program is available on a shared channel. This is determined by reviewing contents of the BSPM from step 604. If the desired program is available on a shared channel, step 622 leads to step 800 of FIG. 8 (discussed below). If the desired program is available on an individual channel, then step 622 leads to step 720 of FIG. 7 (discussed below).

Establishing Reception of Individual Broadcast (FIG. 7)

Introduction

As mentioned above, FIG. 7 shows operations 700 to establish broadcast service on an individual channel, where broadcast service was been found to be unavailable via shared channel, either by examination or the BSPM (step 622), character of the BSPM (step 608), or absence of the BSPM (step 614). The operations 700 continue from steps 619, 618 (individual broadcast only embodiments, where desired program is available) or step 622 (individual/shared broadcast embodiment where shared broadcast is unavailable from base station).

Start-Service Message

In step 720 the subscriber-station sends a "start-service" request to the base station to initiate receipt of the desired broadcast program. In the context of CDMA-2000 for example, this request may comprise an ORIGINATION message, that is, the type of message normally used to initiate a point-to-point call. A CDMA-2000 ORIGINATION message is sent with one or more pilot signal strength reports needed for choosing an appropriate base station in the establishment of a point-to-point call. Such pilot signal strength reports, for example, are used by the base station to adjust signal strength and base station "active sets" according to the subscriber-station's signal reception.

A different option is to use a REGISTRATION message, that is, a message type normally not accompanied by a pilot signal strength report and therefore suitable for use to advise base stations of a subscriber-station's whereabouts. In either case, the ORIGINATION or REGISTRATION message of step 720 includes a flag, indicator, field, addendum, or other data indicating that the subscriber-station seeks to receive a broadcast program on a point-to-point connection, and the identity of that program. The remaining format, content, and use of such messages is well known under various standards for wireless communications, including CDMA-2000.

Optionally, before sending the start service message of step 720, the subscriber-station may verify enrollment of the user for the requested broadcast program, for example, by cross-checking the program against a list of programs for which the user has completed enrollment. The enrollment list may be stored at the subscriber-station, base station, or another appropriate site.

Broadcast

In step 722, the subject base station prepares to transmit the subject broadcast program, for example by requesting another copy of the corresponding information stream from the content server 102 (in one embodiment) or by replicating the requested program's information stream for the subject subscriber-station.

Optionally, before starting transmission of the desired program in step 722, the base station may verify enrollment of the user to receive the requested broadcast program. This may be achieved, for example, by cross-checking the program against a list of programs for which the user has completed enrollment. The enrollment list may be stored at the base station, a central records facility, or another appropriate site.

After preparations have been made to transmit the program, and user enrollment has been verified (if applicable), the base station begins transmitting the desired broadcast program on the assigned channel (step 722). Also, the base station specifically identifies this channel to the subscriber-station in, a channel assignment message, enabling the subscriber-station to begin receiving the broadcast (step 722). The channel assignment message may also include other specifics of the individual channel to be used, such as data rate, error correction, outercoding, and other specifics, some or all of which may be specified by citation of a "service option" or other abbreviated code of prearranged significance.

Receipt

In step 724, the subscriber-station adjusts its transceiver to receive the base station's transmissions of the desired program upon the assigned channel. Thus, in steps 722/724 the base station begins transmitting, and the subscriber-station begins receiving, the desired broadcast program on an individual, point-to-point, traffic channel.

In step 726, the base station and subscriber-station continue to transmit and receive the broadcast program. There are various options, during this time, for providing the subscriber-station with updates as to the broadcast lineup. This can be useful to the subscriber-station because, while in the traffic mode, the subscriber-station cannot monitor the overhead channel 505; thus, contents of the BSPM are not available to the subscriber-station.

In one embodiment, the base station in step 726 occasionally repeats the entire BSPM on a "parallel" channel of the assigned, individual channel, that is, a different physical channel associated with this channel. This may occur on a periodic or non-periodic schedule, or in response to a predetermined stimuli, or according to another schedule.

According to another option for step 726, the BSPM may be repeated whenever a handoff occurs. Namely, in anticipation of handoff of the subject subscriber-station, when the subject base station negotiates certain handoff parameters with a target base station, the subject base station additionally obtains the target base station's broadcast lineup. Then, along with other conventional messages conveyed to the subscriber-station during handoff, the subject base station additionally transmits the target base station's broadcast program lineup.

In still another embodiment of step 726, the subject base station may provide updates of the broadcast information to the subscriber-station on-request, or responsive to a predetermined event or condition, or on another basis.

Step 728 asks whether the connection of the current individual channel has ended, which may occur when the user chooses to stop receiving the current program, the call is dropped, or the wireless network cancels the connection for some administrative reason. If the connection has not ended, the broadcast continues in step 726. Whenever step 728 determines, however, that the present call has ended, step 728 returns to one of steps 604, 608, 614 as appropriate to possibly start another broadcast connection.

Establishing Reception of Shared Broadcast (FIG. 8)

Introduction

As mentioned above, FIG. 8 shows operations 800 to establish broadcast service where the subscriber-station has found (step 622) that the desired program is available via shared channel. The operations 800 continue from step 622, shown in FIG. 6 and described above.

In step 801, the subscriber-station asks whether the subject base station is presently transmitting the desired program on a shared channel. This is determined by the subscriber-station's review of the BSPM 900, and in particular, the information from column 910 (if the BSPM is equipped with such information), or alternatively by attempting to receive the desired program over the shared channel 909 identified in the BSPM 900. If the subject base station is presently transmitting the subject program, the subscriber-station sends a REGISTRATION message in step 818. This message advises the base station of the subscriber-station's presence, identity, features, etc. Optionally, the REGISTRATION message may include a flag, indicator, field, addendum, or other data indicating that the subscriber-station intends to monitor the desired broadcast program on a shared channel to assist the base station in tracking which subscriber-stations are monitoring which shared channels. The REGISTRATION message, as opposed to an ORIGINATION message, is appropriate because it does not include unnecessary content, such as pilot signal strength reports, aimed at initiating a point-to-point call. In step 816, the subscriber-station begins to monitor the desired program on the specified shared channel.

Alternatively, if the subscriber-station finds that the base station is not presently transmitting the subject program on a shared channel, then step 802 is performed. Here, the subscriber-station determines whether the desired program is available from the base station on both shared and individual channels. This information is available from the BSPM 900, and in particular, columns 906, 908.

If the desired program is available by shared channel only, then step 802 goes to step 810. In this situation, the base station is capable of providing the desired program via shared channel, but it is no doing so presently. In step 810, the subscriber-station sends a start-service message. In one example, the start-service message may comprise a REGISTRATION message advising the base station of the subscriber-station's presence, identity, features, etc. The REGISTRATION message includes a flag, indicator, field, addendum, or other data indicating that the subscriber-station seeks to receive the desired broadcast program on a shared channel. This flag triggers the base station (as discussed below) in starting the shared broadcast, and also helps the base station in tracking which subscriber-stations are monitoring which shared channels. The REGISTRATION message, as opposed to an ORIGINATION message, is appropriate because it does not include unnecessary content, such as pilot signal strength reports, aimed at initiating a point-to-point call. The subscriber-station also starts a "timeout" timer in step 810.

In step 811, the base station receives the subscriber-station's REGISTRATION message and request, and begins to transmit the desired program on the appropriate shared channel. In step 812, the subscriber-station determines whether it has started to receive broadcast of the desired program before the timeout timer reaches a preset expiration, such as thirty seconds or another period of time. If not, step 812 goes to step 814 where the subscriber-station issues a "service unavailable" message to its user. On the other hand, if the base station started transmission in step 811 as planned, then step 812 is satisfied with a "yes" answer, and the subscriber-station begins receiving the desired program in step 816.

In contrast to steps 810-812, step 802 goes to step 804 if the subscriber-station determines that the desired program is available via both shared and individual channels. In this case, the subscriber-station in step 804 sends a start-service message. As one example, the start-service message may comprise an ORIGINATION message, that is, the type of message normally used to initiate a point-to-point call. This ORIGINATION message includes a flag, indicator, field, addendum, or other data indicating that the subscriber-station seeks to receive the desired broadcast program on a point-to-point connection. The ORIGINATION message is sent with a pilot signal strength message because it assists the base station in adjusting signal strength and base station "active sets" according to the subscriber-station's signal reception. Also in step 804, the subscriber-station starts a "timeout" timer. The ORIGINATION message is particularly useful in this context because it can be used to trigger the base station to initiate shared broadcast, but also includes additional information required by the base station to setup a point-to-point call should the base station elect to transmit the desired program on an individual channel.

In step 806, the base station responds to the start-service message of step 804. Optionally, before starting the requested broadcast service, the subscriber-station and/or base station may verify enrollment of the user for the requested broadcast program, for example, by cross-checking the program against a list of programs for which the user has completed enrollment. The enrollment list may be stored at the subscriber-station, base station, or another appropriate site.

After (optionally) checking enrollment, the base station elects (step 806) whether to provide the desired program via shared or individual channel. This decision is based on various considerations, such as the base station's overall transmission power output, the number of subscriber-stations receiving individual broadcasts of the subject program, the availability of Walsh codes to the subject base station, network condition, resource availability, and the like.

After choosing between shared/individual channel types, the base station initiates the chosen service. In the case of shared broadcast, the act of initiating service involves the base station starting to transmit the desired program on the specified shared channel. In the case of individual broadcast, the act of initiating service involves base station operations such as the following. First, the subject base station prepares to transmit the subject broadcast program, for example by requesting another copy of the corresponding information stream (in one embodiment) or by replicating the program's information stream for the subject subscriber-station. Next, the base station begins transmitting the desired broadcast program on the assigned channel. Also, the base station specifically identifies this channel to the subscriber-station by sending a channel assignment message, enabling the subscriber-station to begin receiving the broadcast. The channel assignment message may also include other specifics of the traffic channel to be used, such as data rate, error correction, outercoding, and other specifics, some or all of which may be specified by citation of a "service option" or other abbreviated code of prearranged significance.

In step 808, the subscriber-station asks whether it has received channel assignment (indicating the requested broadcast is being transmitted on an individual channel) or it has started receiving the desired program via shared channel. Without evidence of individual or shared broadcast, the timeout timer expires and step 808 goes to step 814 and the subscriber-station issues a "service unavailable" message to the user.

If the subscriber-station detects broadcast of the desired program, however, on the designated shared channel, then step 808 goes to step 816 where the subscriber-station begins to receive the broadcast. In contrast, if the subscriber-station receives a channel assignment message indicating the base station's transmission of the desired program on an individual channel, then step 808 advances to step 724 of FIG. 7, where the subscriber-station starts receiving the desired program via individual channel.

OTHER EMBODIMENTS

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A method for operating a wireless communications network, comprising operations of:
   a base station receiving a number of broadcast programs from a content server;
   a subscriber-station conducting initial evaluation operations to determine availability of a desired one of the broadcast programs from the base station via a shared channel for common reception by multiple subscriber-stations;
   if available via shared channel, performing a first operational sequence to initiate reception of the desired broadcast program via a shared channel, the first operational sequence comprising operations of: the subscriber-station monitoring the desired broadcast program via the shared channel;
   if unavailable via shared channel, conducting follow-up evaluation operations to determine availability of the desired program from the base station via individual channels dedicated for use by single subscriber-stations;
   if available via individual channels, performing a second operational sequence to initiate reception of the desired broadcast program upon an individual channel, the second operational sequence comprising operations of: the subject subscriber-station sending the base station a staff-service message identifying the desired program;

responsive to the start-service message, the base station transmitting a message to the subscriber-station assigning an individual channel dedicated for use by the subscriber-station to receive the desired program;

the base station commencing transmission of the desired program to the subject subscriber-station upon the assigned channel;

responsive to receiving the channel assignment message, the subject subscriber-station commencing receipt of the desired broadcast program on the assigned channel.

2. The method of claim 1, where the first operational sequence comprises:

determining whether the base station is presently transmitting the desired program on a shared channel;

if so, the subscriber-station commencing reception of the desired broadcast program on a shared channel, if not, the subscriber-station determining whether the desired broadcast is available on both individual and shared;

if both, performing operations comprising:

the subscriber-station sending a staff-service message to the base station and also starting a timer;

the base station receiving the start-service message and performing one of the following: (1) commencing transmission of the desired broadcast program on a shared channel, (2) transmitting a message to the subscriber-station assigning an individual channel dedicated for use by the subscriber-station to receive the desired program and commencing transmission of the desired program to the subject subscriber-station upon the assigned channel;

the subscriber-station performing one of the following: (1) receiving the desired broadcast program via the shared channel, (2) responsive to receiving the channel assignment message, the subject subscriber-station commencing receipt of the desired broadcast, (3) responsive to expiration of the timer without the subscriber-station receiving the desired broadcast program via the shared channel or receiving a channel assignment message, the subscriber-station issuing a failure message;

if not both, performing operations comprising:

the subscriber-station sending a staff-service message;

the base station commencing transmission of the desired program on a shared channel;

the subscriber-station commencing receipt of the desired program via the shared channel.

* * * * *